Oct. 6, 1931.                 C. E. MASTERS                 1,826,625
                              MACHINE TOOL
                            Filed June 9, 1930
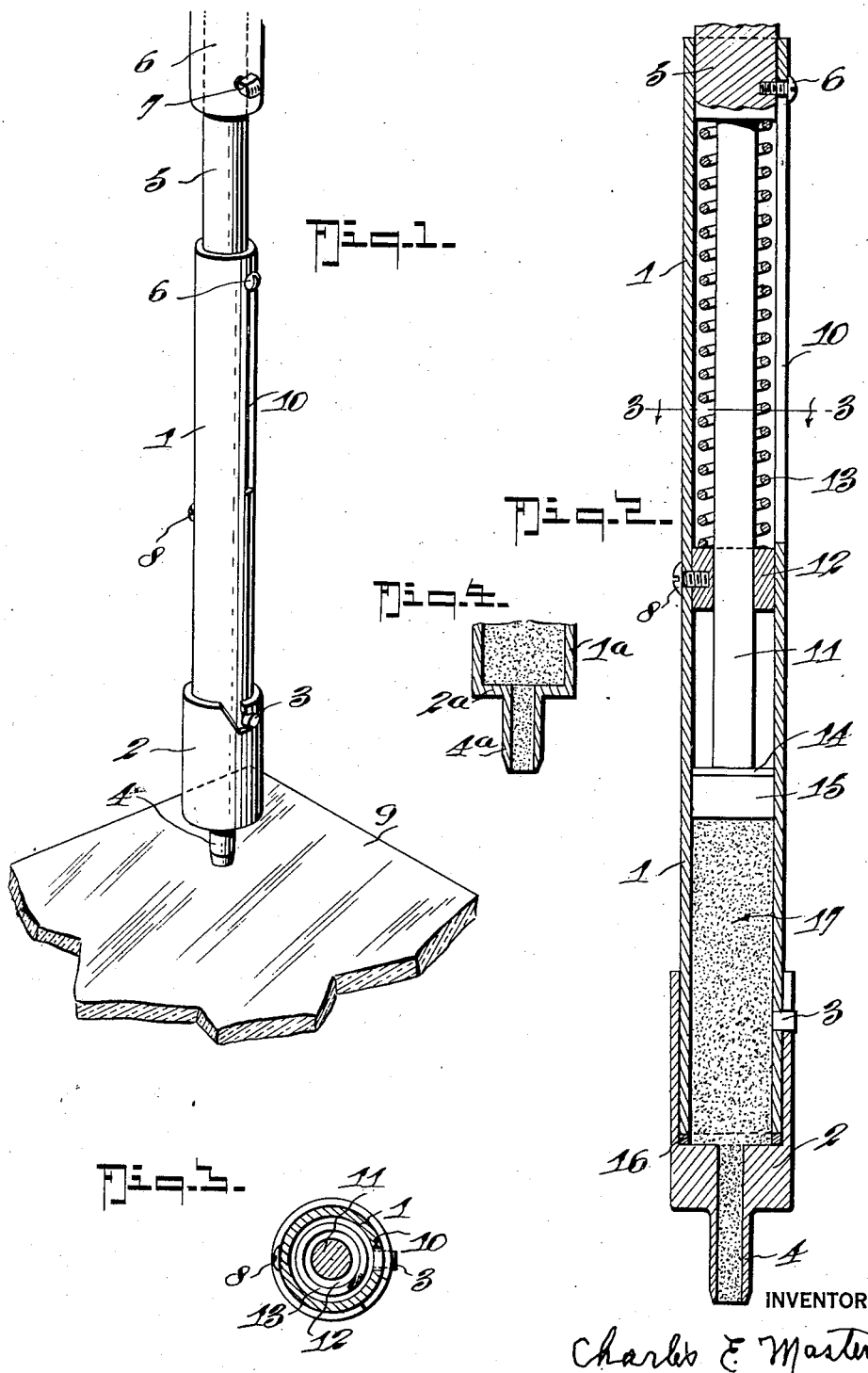
INVENTOR
Charles E. Masters Patented Oct. 6, 1931

1,826,625

UNITED STATES PATENT OFFICE

CHARLES E. MASTERS, OF PERRY, MISSOURI

MACHINE TOOL

Application filed June 9, 1930. Serial No. 459,954.

This invention relates to machine tools generally. More specifically this invention relates to drills employing a cutting abrasive.

An object of this invention is to provide a tubularly shaped cutting tool employing a finely divided abrasive which is forced into engagement with the surface being cut.

Still another object of this invention is to provide a cutting tool having a tubular portion thru which abrasive material is forced into engagement with the surface being cut.

A further object of this invention is to provide a cutting tool having a tubular portion thru which abrasive material is forced under a slight uniform pressure into a removable tubular bit for engagement with the surface being cut.

Other objects and features of this invention will be apparent to those skilled in the art to which this invention pertains from the following specification and the appended claims.

In accordance with this invention a drill is provided with a tubular section in which abrasive material is housed under a slight pressure applied to the material thru the action of a resilient member which is also preferably housed in the tubular section. The abrasive material is forced out of the tubular section thru the bit member of the drill into engagement with the surface being drilled. Interchangeable bit members of different sizes are provided to the drill so that different size holes may be readily drilled without removing the drill from the drill press simply by interchanging the bit members. The drill of my invention is conveniently employed in a drill press at a speed of about 200 revolutions per minute in drilling plate glass without any appreciable danger from heating.

This invention will be more clearly understood from a reference to the accompanying drawings, in which, briefly:

Fig. 1 illustrates a perspective view of this invention;

Fig. 2 is a vertical sectional view of the drill;

Fig. 3 is a horizontal sectional view taken along the line 3—3 of Fig. 2; and

Fig. 4 is a fragmentary view of a modified form of this invention.

Referring to Fig. 1 in detail, reference numeral 1 designates the tubular body member of the drill. A bit member 2 having a notched portion for engagement with the retaining pin 3, which is positioned on the tubular body member 1, is provided to the drill. Section 4 of the bit 2 is that portion of the drill which is caused to engage with the work 9. The size of this section 4, that is, the outer dimension of this section, determines the size of the hole bored by the drill. The bit 2 may be made integral with the tubular member 1, as illustrated in Fig. 4, wherein reference numeral 1a designates the tubular member and 2a and 4a designate the bit portion. Bits with different sizes of drilling sections interchangeable one with the other may be provided so that various sizes of holes may be bored by the tool as desired. The tubular member 1 is retained in slidable engagement with the rod-shape member 5 by the screw 6 which is positioned in the co-axial slot 10 formed in the tubular member. The screw 6 may be eliminated by making the tubular member 1 and the member 5 of polygonal cross-section instead of circular. The screw 6 permits limited co-axial movement of the member 1 with respect to the member 5, but does not permit rotary movement of the former member with respect to the latter.

The member 5 is made of such a size as to fit into the chuck 6, which is provided with a tightening screw 7, of a drill press.

As illustrated in Fig. 2, the plunger member 11 is attached to the member 5. A bearing 12 which is retained in fixed relation with respect to the tubular member 1 by the screw 8 is positioned within the member 1 to guide the plunger 11 and to provide an abutment for the spring 13 one end of which abuts the member 5 and the other the member 12. Pistons 14 and 15, the latter being of material such as leather, are provided to the plunger rod 11. A washer 16 of material such as leather or the like is positioned between an extremity of the tubular member 1 and an inner wall of the bit 2. Portions of the interior of the tubular member 1 and the section 4 are filled with an abrasive 17, such as emery of carborundum powder, powdered rouge or the like mixed with a liquid, such as water, oil or other suitable liquids. This abrasive material 17 is pressed out, thru the centrally disposed hole in the bit 2, into engagement with the work being bored. The pressure with which the abrasive is forced into engagement with the work is maintained substantially constant throughout the drilling of relatively thin materials through the action of the spring 13.

In Fig. 3 are illustrated more clearly the relative positions of the various elements of the drill with respect to each other.

The drill of my invention may be very advantageously employed in boring holes into hard materials, such as glass, tool steels, rocks and similar substances, particularly where neat and well cut holes are desired. The coarseness of the abrasive material used in the drill is governed to a certain extent by the material to be cut, the precision of the holes desired and the speed at which the drill is operated. The pressure applied to the drill which varies with the size and quality of spring used in the drill also affects the rapidity with which holes are drilled. In drilling thru glass this drill may be operated to bore holes as close as one-eighth of an inch to the edge of the glass material without breaking or checking the material.

While I have described my invention in considerable detail, it is, of course, understood that I do not desire to restrict it to the exact details as set forth in the foregoing specification except in so far as those details may be defined by the appended claims.

What I claim and desire to secure by Letters Patent of the United States is as follows:

1. In combination, a hollow member, a finely divided abrasive in said hollow member, means for pressing said abrasive toward an extremity of said hollow member, and means for turning said hollow member whereby said abrasive is caused to cut a hole through work material.

2. In combination, a hollow member, finely divided abrasive in said hollow member, and resilient means positioned in said hollow member for pressing said abrasive toward an extremity of said tubular member whereby said abrasive is caused to engage work material.

3. In combination, a hollow member, abrasive material in said hollow member, means for transmitting rotary motion to said hollow member, said means coacting with said hollow member to press said abrasive material toward an extremity of said hollow member whereby said abrasive material is caused to engage with the work material.

4. In combination, a hollow member, abrasive material in said hollow member, a plunger positioned in said hollow member for forcing said abrasive material toward an extremity of said hollow member, and a resilient member for maintaining a substantially uniform pressure upon said abrasive material.

5. In combination, a hollow member, abrasive material in said hollow member, a plunger cooperating with said hollow member to press said abrasive toward an extremity of said hollow member for cutting engagement with work material being drilled, and a removable bit member positioned upon said hollow member.

In testimony whereof I affix my signature.

CHARLES E. MASTERS.